F. G. HALDY.
ELECTRIC CONTROLLING MEANS.
APPLICATION FILED AUG. 19, 1908.
908,251.
Patented Dec. 29, 1908.
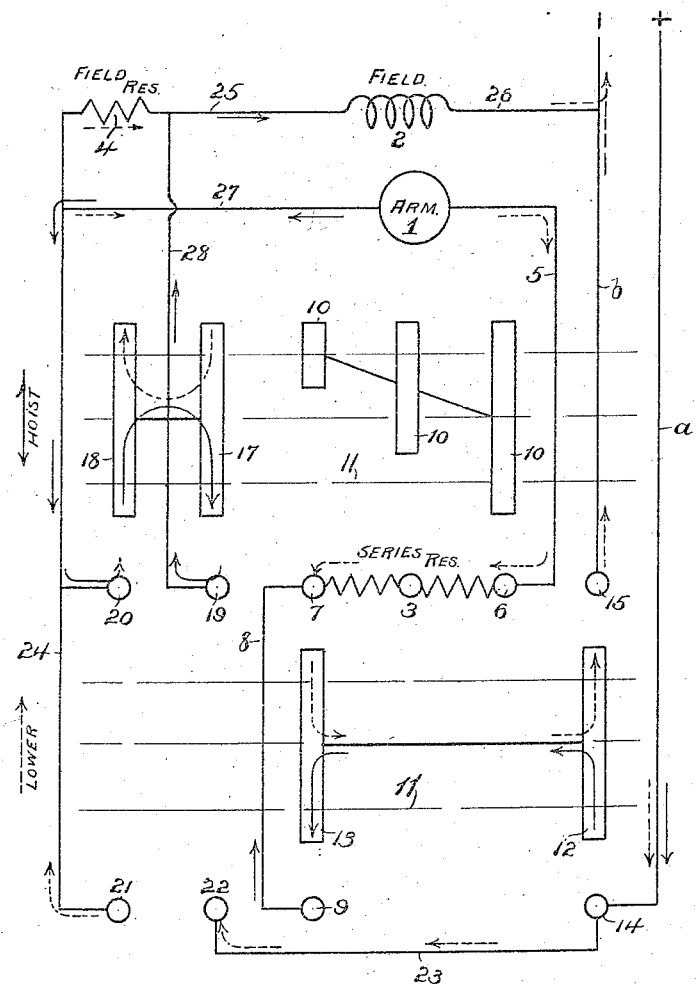

UNITED STATES PATENT OFFICE.

FREDERICK G. HALDY, OF STAMFORD, CONNECTICUT, ASSIGNOR TO THE YALE & TOWNE MANUFACTURING COMPANY, OF STAMFORD, CONNECTICUT.

ELECTRIC CONTROLLING MEANS.

No. 908,251.   Specification of Letters Patent.   Patented Dec. 29, 1908.

Application filed August 19, 1908. Serial No. 449,312.

*To all whom it may concern:*

Be it known that I, FREDERICK G. HALDY, of Stamford, in the county of Fairfield and State of Connecticut, have invented certain new and useful Improvements in Electric Controlling Means; and I do hereby declare the following to be a full, clear, and exact description of the invention, such as will enable others skilled in the art to which it appertains to make and use the same.

This invention relates to improvements in electric controlling means and more particularly to means for controlling the lowering speed of electric hoists,—the object of the invention being to provide simple and efficient means whereby the lowering speed of electric hoists can be controlled electrically.

With this object in view, the invention consists in the combination with an electric motor of means for placing the armature and field coils in series with each other and for shifting the connections and placing said armature and field coils in parallel and reversing the armature circuit.

The invention further consists in the combination with an electric motor and a resistance, of means for placing the armature and field coils in series with each other and for shifting the connections to place the armature in parallel with the field coils and the resistance, and for reversing the armature circuit.

The invention further consists in certain novel arrangements of parts and circuits as hereinafter set forth and pointed out in the claims.

The accompanying drawing is a diagrammatical view illustrating my invention.

As hereinbefore intimated my improvements are intended more particularly for use in controlling the motors of electric hoists, and especially to provide electrical means which will operate to control the speed at which the hoist will descend,—viz., the lowering speed of the hoist,—without necessity for the use of mechanical brakes.

1 represents the armature and 2 the field winding of the motor of an electric hoist,— the shaft of the armature being mechanically connected in any suitable manner with the hoist (not shown) for operating the same. Suitable switch devices are provided for connecting the armature and field winding in series with each other and in series with a regulating resistance or rheostat 3 or to shift the motor connections (without necessarily disturbing the connections between the individual coils of the field winding), for placing the armature 1 and rheostat 3 in parallel with the field winding 2 and an added resistance 4, which latter will be in series with the field winding. When the motor connections are thus shifted, the armature circuit will be reversed without disturbing the direction of current through the field coils.

It will be understood that the motor will be operated with the armature and field winding in series when the hoist is to be raised, but when the hoist is to be lowered, the switch devices will be operated to reverse the armature circuit and place the armature in parallel with the field winding and the added resistance 4, which latter will be such as will cut down the current within carrying capacity of the field coils. The motor will now run in the reverse direction during the lowering of the hoist, and should the latter "coast", the speed of the armature will be increased to such an extent that the counter electro-motive force generated, will overcome the electro-motive force of the line current. The motor will, under such conditions, run as a generator and operate as a dynamic brake, and thus control the lowering speed of the hoist.

The switch devices hereinbefore referred to may be variously constructed, but the arrangement shown in drawing will suffice, and will now be more particularly described.

A conductor 5 connects one of the commutator brushes with one contact terminal 6 of the variable resistance 3 and the contact terminal 7 at the other end of said resistance is connected by a conductor 8 with a contact 9. A series of staggered segments 10 on a drum 11 coöperate with the resistance contacts for throwing said resistance into and out of circuit. The drum 11 is also provided with segments 12 and 13 electrically connected together, the segment 12 being adapted (when the drum is turned) to coöperate with a contact 14 or a contact 15, and the segment 13 being adapted to engage the contact 9 or 7. The plus lead wire *a* is connected with the contact 14, while the minus lead wire *b* is connected with the contact 15. The drum 11 is also provided with segments 17 and 18, electrically connected together and adapted; (when the drum is turned in one direction) to engage contacts 19 and 20, and when turned in the other direction, to engage contacts 21 and 22, the latter being connected, by a conductor 23 with the contact 14. A conductor 24 is connected at one end with the contact 21 and at the other end with the supplemental resistance 4, the other end of the latter being connected by a conductor 25, with one terminal of the field winding 2, while the other end of said winding is connected, by a conductor 26 with the minus lead wire b. The conductor 24 is also connected by a conductor 27 with one of the commutator brushes of the motor. A conductor 28 connects the contact 19 with the conductor 25 between the supplemental resistance 4 and the field winding.

When the motor is to be operated to raise the hoist, its armature and field winding and armature will be placed in series with each other and with the rheostat or variable resistance 3, by turning the drum 11 in one direction. The circuit may then be traced as follows: and as indicated by the full-line arrows. From lead wire a to contact 14; thence to segment 12, to segment 13, and thence to contact 9. From the latter the current will pass through conductor 8 to contact 7 of the rheostat, and from the latter, by way of the conductor 5 to the armature. The current will pass from the armature by way of conductor 27 to the conductor 24 and from the latter through contact 20, segments 18—17, contact 19, and conductors 29 and 25 to the field winding, from the latter, by the conductor 26 to the minus lead b.

When the hoist is to be lowered, the switch devices will be operated, to reverse the armature circuit, and place the armature in parallel with the field winding and the supplemental resistance 4. The circuits may now be traced as follows and as indicated by the dotted arrows: from lead a to contact 14; by conductor 23 to contact 22; thence by the electrically connected segments 17—18 to contact 21; thence by conductors 24 and 27 to the armature; from the latter, by way of conductor 5 to the rheostat; thence through the connected segments 12—13 and contacts 7—15 to the minus lead b. At the juncture of the conductors 24 and 27 the current will divide,—a portion passing through the supplemental resistance 4 and the field winding so as to place these coils in parallel with the armature.

Having fully described my invention what I claim as new and desire to secure by Letters-Patent, is:—

1. The combination with an electric motor and a supplemental resistance, of means for placing the armature and field winding in series and excluding said supplemental resistance, said means also operative to reverse the armature circuit and place it in parallel with the field winding and the supplemental resistance and the latter in series with the field winding.

2. The combination with the armature and field magnets of an electric motor, of a supplemental resistance, switch devices for including said supplemental resistance in series with the field winding and placing both the field winding and supplemental resistance in parallel with the armature, said switch devices including means for cutting out said supplemental resistance and placing the field winding in series with the armature and for reversing the armature circuit.

3. The combination with the armature and field winding of an electric motor, and a rheostat in series with the armature, of a supplemental resistance, switch devices operative to include the armature and field winding in series with the motor circuit, said switch devices including means for reversing the motor circuit and placing the armature in parallel with the field winding and the supplemental resistance in series with the latter.

In testimony whereof, I have signed this specification in the presence of two subscribing witnesses.

FREDERICK G. HALDY.

Witnesses:
H. J. LAMBORN,
JAMES BROCK.